United States Patent Office 3,457,027
Patented July 22, 1969

3,457,027
IMPROVING THE CRIMPABILITY OF KERATINOUS FIBERS BY REACTING SAME WITH A VINYL AROMATIC COMPOUND IN COMBINATION WITH AN ACRYLIC ESTER
Edgar Dare Bolinger and Greville Machell, Spartanburg, S.C., and Francis W. Marco, Metheun, Mass., assignors to Deering Milliken Research Corporation, Spartanburg, S.C., a corporation of Delaware
No Drawing. Filed Dec. 6, 1962, Ser. No. 242,617
Int. Cl. D06m 3/02
U.S. Cl. 8—127.5                30 Claims This invention relates to processes for producing crimped keratin fibers and to the fibers so produced.

Ethylenically unsaturated compounds are reacted with keratin fibers for a variety of reasons, e.g., to improve their dyeability with various dyestuffs, for shrinkproofing, and the like. These reactions are invariably conducted under conditions whereby the keratin fibers straighten substantially, thereby losing their inherent desirable crimp. This crimp loss, heretofore, has been substantially irreversible.

It has now been discovered that by using a novel combination of ethylenically unsaturated compounds, this lost crimp can be recovered to a controllable degree.

The novel combination of ethylenically unsaturated compounds should contain at least one vinyl aromatic compound, preferably a styrene-type compound, and at least one ethylenically unsaturated compound having a glass transition temperature less than about 40° C., preferably an acrylic acid ether of a saturated monohydric alcohol containing at least two carbon atoms. Best results are obtained when this combination of compounds is applied to keratin fibers to an extent whereby the fibers increase in weight by at least about 50%, preferably greater than about 100%, and when a substantial portion, e.g., at least about 15%, preferably greater than 50%, of the added weight is derived from the vinyl aromatic component.

Keratin fibers reacted with this novel combination of compounds are characterized by their ability to contract at least 5% in length upon steaming. Those fibers reacted with greater than 100% of the ethylenically unsaturated compounds, particularly where the vinyl aromatic component content is substantial, generally tend to contract greater than 10% under similar steaming conditions. Contractions greater than 20% can generally be achieved when the vinyl aromatic component comprises a major proportion of the combination or when the reaction is conducted in the presence of an ethylenically unsaturated cross-linking agent or when the reaction is conducted on relatively loose fibers under conditions of tension.

There appears to be no ready explanation for the capability of fibers treated in accordance with this invention to contract under steaming conditions. For example, neither vinyl aromatic compounds nor ethylenically unsaturated compounds having a glass transition temperature less than about 40° C. alone impart to keratin fibers an ability to contract. This combination of compounds, however, synergistically coreacts with keratin fibers to impart thereto an ability to contract under steaming conditions.

After contraction, keratin fibers treated in accordance with this invention have a greatly increased crimp over the non-contracted reacted fibers. This crimp is generally of a greater amplitude and lesser frequency than the crimp of the untreated fiber, e.g., the contracted, and consequently crimped, fiber of this invention has less crimps per inch than the untreated fiber, but the crimp is more noticeable in that it is of greater height, or amplitude.

While exposure of the reacted keratin fibers to steam is the preferred technique for developing the latent crimp therein, this crimp can be developed by heating the reacted fibers in any desired manner, e.g., by contacting with a heated plate or tube, hot air, radiant heat from lamps or the like. The temperature of activating the latent crimp in fibers treated in accordance with this invention generally exceeds the glass transition temperature of the compounds utilized.

The novel combination of compounds is preferably reacted with the keratin fibers while said fibers are relatively loose with respect to adjacent fibers, e.g., in a form of fibers prior to processing into yarn, although yarn reacted with the combinations of compounds is somewhat improved. Development of the latent crimp is also preferably conducted on the fibers in a relatively loose mass, in that the developed crimp aids considerably in processing of the fibers into yarn. Alternatively, however, the reacted fibers can be processed into yarn, fabric and even garments and then treated to develop the latent crimp therein.

Improved results are obtained when the reaction is conducted on a relatively loose mass of keratin fibers held under tension. Apparently, more latent crimp is built into the fibers when the reaction is conducted in this manner. Tension is conveniently applied during winding of the loose fibers, e.g., wool top, in preparation for the reaction.

It is essential that at least one of the components of the novel combination of ethylenically unsaturated compounds comprises a vinyl aromatic compound. While styrene comprises a preferred vinyl aromatic compound, additional suitable compounds include methylstyrenes, such as m-methylstyrene, o-methylstyrene, p-methylstyrene; dimethylstyrenes, such as 2,5-dimethylstyrene; halogenated styrenes, such as m-bromostyrene, p-bromostyrene, p-iodostyrene, pentachlorostyrene, $\alpha,\beta,\beta$-trifluorostyrene, 2,5-bis(trifluoromethyl) styrene, 3-trifluoromethyl styrene dichlorostyrene, and the like; the various cyanostyrenes; the various methoxystyrenes, e.g., p-methoxystyrene; vinyl naphthalenes, etc., e.g., 4-chloro-1-vinylnaphthalene, 6-chloro-2-vinylnaphthalene and the like.

Suitable compounds having a glass transition temperature less than about 40° C., for combination with the above vinyl aromatic compounds, include the acrylic and methacrylic acid esters of saturated aliphatic monohydric alcohols, for example, ethyl, $\beta$-chloroethyl, propyl, isopropyl, butyl, isobutyl, amyl, isoamyl, hexyl, heptyl, octyl, 2-ethyl hexyl, nonyl, decyl, octadecyl, and the like up to the dodecyl acrylates and methacrylates. When the ester group contains more than about 12 carbon atoms, the reactivity thereof is sufficiently low as to make its use less feasible, although the desired improvement in crimp may be realized when the ester group contains up to 20 carbon atoms or more. An optimum balance of reactivity and improved properties is found in those esters containing from 4 to 8 carbon atoms, particularly butyl acrylate and 2-ethyl hexyl acrylate and, consequently, these esters are preferred for use in accordance with this invention.

Additional compounds, though less preferred, include the vinylidene halides, e.g., vinylidene chlorides, bromides, etc.; vinyl esters of saturated aliphatic monocarboxylic acids, e.g., vinyl propionates, valerates, laurates, etc.; vinyl thiophene, vinyl pryidine, vinyl pyriole and the like, as well as hydroxyalkyl esters of acrylic and methacrylic acid such as hydroxyethyl acrylate and methacrylate, hydroxymethyl acrylate and methacrylate, t-butylaminoethyl methacrylate and the like.

The glass transition temperature is a well-known property and is the temperature at which a sheet of a polymer is transformed from a glass-like solid state to a softened state. Above the glass transition temperature, the volume of the sheet increases more rapidly with an increase in temperature. The point at which this volume increase begins may be readily determined in a plot of volume versus temperature. These glass transition temperatures may be readily determined by standard A.S.T.M. heat deflection temperature measurements, e.g., A.S.T.M. Designation D648–45T, issued 1941, revised 1944, 1945.

Additional improvement in the crimpability of keratin fibers reacted with the above combination of compounds is realized when the keratin fibers are also reacted with at least one of the well-known ethylenically unsaturated cross-linking agents. Besides the preferred cross-linking agents divinyl benzene and ethylene glycol dimethacrylate, there may also be utilized allyl acrylate, allyl methacrylate, diallyl adipate, diallyl amine, diallyl itaconate, diallyl maleate, diallyl crotonate, ethylene glycol diacrylate, triallyl amine, triallyl phosphate, isoprene, vinyl acrylate and the like.

This class of ethylenically unsaturated compounds can be reacted with keratin fibers through a number of well-known processes. For example, keratin fibers may be reacted with the desired compounds in the presence of a catalyst or initiator system for inducing polymerization of the compounds. Among such systems, there are included azo catalysts, such as azobisisobutyronitrile, as well as irradiation under the influence of high energy fields, including the diverse actinic radiations, such as ultra-violet, X-ray and gamma radiations, as well as radiations from radioactive materials such as cobalt-60.

In general, however, it is preferred that the reaction with the particular combination of ethylenically unsaturated compounds be conducted in the presence of a redox catalyst system, i.e., a catalyst system composed of a reducing agent and an oxidizing agent initiator. Although the catalytic mechanism is not completely understood, it is believed that the interaction of these agents provides free radicals which cause polymerization of the compounds, which preferably are in monomeric or low polymeric form, onto the keratin fibers.

The reducing agent may be an iron compound, such as the ferrous salts including ferrous sulfate, acetate, phosphate, ethylenediamine, tetra-acetate; metallic formaldehyde sulfoxylates, such as zinc formaldehyde sulfoxylate; alkali-metal sulfoxylates, such as sodium formaldehyde sulfoxylate; alkali-metal sulfites, such as sodium and potassium bisulfite, sulfite, metabisulfite or hydrosulfite; mercaptan acids, such as thioglycollic acid and its water-soluble salts, such as sodium, potassium or ammonium thioglycollate; mercaptans, such as hydrogen sulfide and sodium or potassium hydrosulfide; alkyl mercaptans, such as butyl or ethyl mercaptans and mercaptan glycols, such as beta-mercaptoethanol; alkanolamine sulfites, such as mono-ethanolamine sulfite and mono-isopropanolamine sulfite, manganous and chromous salts; ammonium bisulfite, sodium hydrosulfide, cysteine hydrochloride, sodium thiosulfate, sulfur dioxide, sulfurous acid and the like, as well as mixtures of these reducing agents. In addition, a salt of hydrazine may be used as the reducing agent, the acid moiety of the salt being derived from any acid, such as hydrochloric, hydrobromic, sulfuric, sulfurous, phosphoric, benzoic, acetic and the like.

Suitable oxidizing agent initiators for use in the redox catalyst system include inorganic peroxides, e.g., hydrogen peroxide, barium peroxide, magnesium peroxide, etc., and the various organic peroxy catalysts, illustrative examples of which are the dialkyl peroxides, e.g., diethyl peroxide, dipropyl peroxide, dilauryl peroxide, dioleyl peroxide, distearyl peroxide, di-(tert.-butyl)peroxide and di-(tert.-amyl) peroxide, such peroxides often being designated as ethyl, propyl, lauryl, oleyl, stearyl, tert.-butyl and tert.-amyl peroxides; the alkyl hydrogen peroxides, e.g., tert.-butyl hydrogen peroxide (tert.-butyl hydroperoxide), tert.-amyl hydrogen peroxide (tert.-amyl hydroperoxide), etc.; symmetrical diacyl peroxides, for instance peroxides which commonly are known under such names as acetyl peroxide, propionyl peroxide, lauroyl peroxide, stearoyl peroxide, malonyl peroxide, succinyl peroxide, phthaloyl peroxide, benzoyl peroxide, etc.; fatty oil acid peroxides, e.g., coconut oil acid peroxides, etc.; unsymmetrical or mixed diacyl peroxides, e.g., acetyl benzoyl peroxide, propionyl benzoyl peroxide, etc.; terpene oxides, e.g., ascaridole, etc.; and salts of inorganic peracids, e.g., ammonium persulfate, potassium persulfate, sodium percarbonate, potassium percarbonate, sodium perborate, potassium perborate, sodium perphosphate, potassium perphosphate, etc.

Other examples of organic peroxide initiators that can be employed are the following: tetralin hydroperoxide, tert.-butyl diperphthalate, cumene hydroperoxide, tert.-butyl perbenzoate, 2,4-dichlorobenzoyl peroxide, urea peroxide, caprylyl peroxide, p-chlorobenzoyl peroxide, 2,2-bis(tert.-butyl peroxy) butane, hydroxyheptyl peroxide, and the diperoxide of benzaldehyde.

The above oxidizing agent initiators, particularly the salts of inorganic peracids, may be utilized alone to initiate the reaction, although faster reactions at lower lyst system. Ferric salts can be used as oxidizing agents is combined with a reducing agent to form a redox catalyst system. Ferric salts can be used as oxidizing agents and form a redox catalyst system with hydrogen peroxide, in which case the peroxide functions as a reducing agent.

The reaction between keratin fibers and ethylenically unsaturated compounds most readily takes place in the presence of water. This generally presents no problem since only small amounts are necessary for this improvement and since the catalyst components and/or monomers are generally applied to the fibers in an aqueous medium. If the substrate is dry at the time of treatment, the reaction rate will be slower. Consequently, it is preferred that the substrate be wet with water when the reaction takes place. Ionic or non-ionic surface active agents may be utilized in any aqueous medium used in applying the reagents.

In the presence of the above systems, it is believed that the ethylenically unsaturated compounds react with the keratin fibers, although the mechanism of the reaction is by no means completely understood. It is known, however, that when acrylonitrile or another ethylenically unsaturated compound of the desired class is applied to keratin fibers in the presence of one of the above initiating systems, the resulting keratin fibers increase considerably in weight, and the reacted compounds cannot be readily removed by extraction techniques utilizing solvents for the homopolymers of such compounds. It is, consequently, believed that the reacted compounds are covalently bonded to the keratin fiber molecule. Reacted compound bound to the fiber by other forces, and hence extractible, provides the same type improvement, but these forms of attachment are less preferred for lack of permanence and aesthetic properties.

The reaction of the above monomers or their derivatives with keratin fibers may be conducted at room temperature, although temperatures between 40 and 60° C. are generally preferred. A temperature in excess of about 100° C. is generally not preferred, since undue degradation of some of the components of the preferred catalyst system, the redox system, occurs at this elevated temperature. In general, such conditions as concentrations of the reagents, pH, time and temperature of reaction may be modified to suit the individual circumstances, while still providing the desired degree of reaction.

The fibrous substrate may be exposed to the monomers in vapor, liquid or emulsion form. Exposure to the vapors of the monomers is conveniently carried out by entraining the vapor in an oxygen free gas, such as nitrogen, and then interposing the substrate in a stream of the gas and vapor. Inert volatile liquids, such as water or an alcohol, may be mixed with the compound being vaporized. Similarly, the fibrous substrate may be immersed in a liquid system, either solution or emulsion type, containing the desired amount of monomer.

Any desired apparatus may be used to apply the above combination of ethylenically unsaturated compounds to keratin fibers, such as apparatus for padding, spraying or the like, but preferred apparatus includes force-flow equipment, such as disclosed in the copending application Ser. No. 243,671, now U.S. Patent No. 3,291,560. With this apparatus, the desired systems can be repeatedly forced back and forth through keratin fibers at controllable flow rates to provide particularly good reaction results.

While the process of this invention is particularly adapted to fibrous substrates composed essentially of keratin fibers, particularly those composed entirely of wool fibers, it is also applicable to substrates wherein synthetic or natural fibers are blended with keratin fibers and to blends with other keratin fibers such as mohair, alpaca, cashmere, vicuna, guanaco, camel's hair, silk, llama and the like. The preferred synthetic fibers include polyamides, such as poly(hexamethylene adipamide); polyesters, such as poly(ethylene terephthalate); and acrylic fibers such as acrylonitrile and homopolymers or copolymers of acrylonitrile containing at least about 85% combined acrylonitrile, such as acrylonitrile/methyl acrylate (85/15); and cellulosics, such as cellulose acetate and viscose rayon. Of the natural fibers which may be blended with the keratin fibers, cotton is preferred. In any such blend, the keratin fibers treated in accordance with this invention are preferably present in at least a major proportion.

In order to provide acceptable fabric aesthetic and physical properties, it is preferred to conduct the desired reaction on keratin fibers in relatively loose form, i.e., prior to processing into yarn as in top, tow, roving, silver and the like. Fabrics produced from these fibers through conventional processing techniques are characterized by softer handle, better drapeability and tear strength, among other improvements, even though more ethylenically unsaturated compound is present in the fabric than is possible when a fabric per se is treated. The same is true, but to a lesser extent, when keratin fibers in yarn form are treated in accordance with this invention and formed into fabrics.

In the following examples, the best modes, as presently known, of practicing the invention are shown.

EXAMPLE I

Onto the perforated beam of a 100-lb. capacity Gaston County package dyeing machine, are wound 63 lbs. of wool top. The beam is then mounted over the perforated spindle, the machine is closed, and the wool is scoured for 30 minutes at 140° F. with 80 gallons of deionized water containing 429 gms. of acetic acid and 149 gms. of Synfac-905, a non-ionic wetting agent containing a nonylphenol-ethylene oxide (⅙–½ molar ratio) condensation product. During the scouring operation, as in all succeeding operations in this example, the liquids are forced through the wool in a cycle of 4 minutes outside to inside, 6 minutes inside to outside.

After scouring, a redox catalyst system composed of 63 gms. of $Fe(NO_3)_3$ and 429 gms. of 50% $H_2O_2$ and 75 gallons of water, adjusted to a pH of 1.35 with 12 lbs. of $H_2SO_4$ and maintained at 100° F., is passed through the wool for 20 minutes. The flow rate of the system through the wool is measured at about 120 gallons per minute.

Fourteen lbs. of butyl acrylate and 5 lbs. of styrene are then added to the recirculating liquid and this system is run for 20 minutes at 120° F. The remaining monomers (43 lbs. butyl acrylate, 14 lbs. styrene) are then added to the system continuously until expended—about 1½ hours.

The reaction is continued for an additional 3 hours, after which the machine is drained and the wool is washed with water at 75° F. for 20 minutes.

As a finishing operation, the wool is then impregnated with 80 gallons of water containing 4% Arquad 16–50, a hexadecyl trimethyl ammonium chloride lubricant and 1% Synfac-905 for 30 minutes at 125° F. The wool top treated in this manner is found to have increased in weight by 100.6%, representing a total monomer conversion of 83.3%.

This procedure is repeated to provide fibers increased in weight by 82% and 127%.

These samples are then passed through a gilling machine. One hundred centimeter samples are then taken (about 24 gms.) and steamed in an autoclave at 5 lbs. per square inch pressure for 5 minutes. The samples are then dried and measured to determined the percentage of contraction of the fibers as a result of the steaming. The sample from the fibers increased in weight by 82% contracts 7% as a result of the steaming treatment, and the remaining samples contract to a proportionately greater extent.

EXAMPLE II

The procedure of Example I is repeated except that the wool top is wound as tightly as possible, without pulling apart the top, onto the spindle prior to conducting the reaction. The fibers increase in weight by 127% after being treated in accordance with the procedures of Example I. Upon steaming, as in Example I, the fibers contact by 31% to provide a product bulkier than untreated wool.

EXAMPLE III

The procedure of Example I is repeated except that equal parts of butyl acrylate and styrene are used in the monomer system. Reaction is conducted to an extent such that the fibers increase in weight by 130% and by 140% in a second procedure. Upon steaming as in Example I, the fibers containing 130% by weight of the reacted material contract by about 15% whereas the fibers containing 140% by weight of reacted material contract by about 12%.

EXAMPLE IV

Into a 2-lb. Gaston County package dyeing machine are mounted 800 gms. of wool top, 400 gms. being mounted on each of 2 bobbins which are placed on the single perforated spindle of the dyeing machine. After scouring for 20 minutes at 140° F. in an aqeous solution containing 0.5% on the weight of wool of Surfonic N-95, a non-ionic surface active agent, and 1.5% on the weight of wool of glacial acetic acid, the fibers are rinsed in water at 100° F. for 15 minutes. An aqueous solution is then made up from 7400 cc.'s of water containing 1.74 gms. of $Fe(NO_3)_3.9H_2O$ (0.03% $Fe^{+++}$ based on the weight of the wool), 12.2 cc.'s of a 50% solution of hydrogen peroxide (50/1 molar ratio of peroxide based on $Fe^{+++}$) and 40 cc.'s of concentrated $H_2SO_4$. The resulting system has a pH of 1.3 and provides a liquor/wool ratio of 11/1. This solution is circulated through the machine and wool top for 10 minutes. Styrene, 2-ethyl hexyl acrylate, and dibutyl maleate are then introduced into the circulating catalyst system continuously for a period of 2½ hours, after which time 480 gms. of styrene, 480 gms. of 2-ethyl hexyl acrylate and 192 gms. dibutyl maleate are added to the system. The temperature is then increased from 75–85° F. to about 120° F. by passing stream through the heat jacket of the package dye machine, and the reaction is continued at this temperature for an additional 60 minutes.

Continuously throughout the circulation of the monomer-catalyst system through the wool top in this example, the aqueous media forced back and through the wool top at a cycle of 4 minutes from outside of the package to the inside of the perforated spindle and 6 minutes from the inside of the perforated spindle to the outside.

After completion of this reaction, the spindle containing the wool top is removed from the machine. While still on the package, the top is fluffy and bulky and is not packed onto spindle as it is when this example is repeated without adding the dibutyl maleate to the system. The fabric samples are then immersed in acetone at room temperature and left there for 4 hours while being agitated, after which this procedure is repeated and the fibers are dried and weighed. No polymer is noticed in the acetone after the extraction procedure. The fibers are found to have increased in weight by 120% and, after steaming as in Example I, contract by 13%.

EXAMPLE V

The procedure of Example IV is repeated except that 470 gms. of 2-ethyl hexyl acrylate, 470 gms. of styrene and 20 gms. of divinyl benzene are utilized to provide an increased weight of the fiber of 103%. After steaming as in Example I, the fibers are found to have contracted by 30%.

EXAMPLE VI

The procedure of Example V is repeated except that 432 gms. of styrene, 432 gms. of 2-ethyl hexyl acrylate and 96 gms. of divinyl benzene are utilized to provide a fiber which increases in weight by 92%. Upon steaming as in Example I, the fibers contract by 24%.

EXAMPLE VII

The procedure of Example I is repeated except that 576 gms. of styrene, 384 gms. of 2-ethyl hexyl acrylate and 192 gms. of dibutyl maleate are utilized to provide fibers increased in weight by 118%. After steaming as in Example I the fibers are found to contract by 28%.

That which is claimed is:

1. A process for producing crimped keratin fibers having ethylenically unsaturated compounds reacted therewith comprising reacting keratin fibers with at least one vinyl aromatic compound in combination with at least one acrylic ester having a glass transition temperature less than about 40° C. in the presence of a free radical generating catalyst, and heating said fibers to effect crimping thereof, the resulting crimp in said fibers being of greater amplitude and lesser frequency than the crimp of unreacted keratin fibers of the same quality.

2. The process of claim 1 wherein at least one vinyl aromatic compound comprises styrene.

3. The process of claim 2 wherein the reaction is conducted to an extent whereby the fibers increase in weight by at least 50%.

4. The process of claim 3 wherein styrene is present in the combination to an extent of at least about 15%.

5. The process of claim 4 wherein styrene is present in the combination to an extent of at least about 50%.

6. The process of claim 1 wherein the ethylenically unsaturated compound comprises butyl acrylate.

7. The process of claim 1 wherein the ethylenically unsaturated compound comprises 2-ethyl hexyl acrylate.

8. The process of claim 1 wherein the fibers are heated by contact with a heated plate.

9. The process of claim 1 wherein the fibers are heated by contact with a heated tube.

10. The process of claim 1 wherein the fibers are heated by contact with hot air.

11. The process of claim 1 wherein the fibers are heated by radiant heat.

12. The process of claim 1 wherein the fibers are heated at a temperature which exceeds the glass transition temperature of the components reacted with said fibers.

13. The process of claim 1 wherein the fibers are reacted with the vinyl aromatic compound and ethylenically unsaturated compound in the presence of an initiating system for the polymerization of said compounds.

14. The process of claim 13 wherein the initiating system comprises a redox catalyst system.

15. The process of claim 14 wherein the reaction is conducted at a temperature between about 40° and about 60° C.

16. The process of claim 1 wherein the reaction is conducted in the presence of a redox catalyst system.

17. The process of claim 16 wherein the redox catalyst system comprises an iron compound.

18. The process of claim 17 wherein the redox catalyst system comprises a peroxide.

19. The process of claim 16 wherein the reaction between the keratin fibers, styrene and at least one acrylic acid ester is conducted in the presence of at least one ethylenically unsaturated cross-linking agent.

20. The process of claim 19 wherein at least one ethylenically unsaturated cross-linking agent comprises divinyl benzene.

21. The process of claim 16 wherein the keratin fibers are relatively loose with respect to each other during said reaction.

22. The process of claim 21 wherein the loose keratin fibers are under increased tension during said reaction.

23. The process of claim 16 wherein the keratin fibers are exposed to steam to effect crimping thereof after said reaction.

24. Keratin fibers having reacted therewith at least one vinyl aromatic compound and at least one ethylenically unsaturated compound having a glass transition temperature less than about 40° C. produced by the process of claim 1.

25. The keratin fibers of claim 24 wherein at least one vinyl aromatic compound comprises styrene.

26. The keratin fibers of claim 25 wherein at least one ethylenically unsaturated compound having a glass transition temperature less than about 40° C. comprises an acrylic ester of a saturated monohydric alcohol containing at least two carbon atoms.

27. The keratin fibers of claim 26 wherein the keratin fibers are reacted to an extent whereby the fibers increase in weight by at least about 50%.

28. Keratin fibers having reacted therewith in the presence of an initiating system for the polymerization thereof styrene, at least one acrylic acid ester and at least one ethylenically unsaturated cross-linking agent produced by the process of claim 1.

29. The keratin fiber of claim 28 wherein the acrylic acid ester contains from 4 to 8 carbon atoms.

30. The keratin fibers of claim 28 wherein the styrene, acrylic acid ester, and cross-linking agent increase the weight of the fibers by at least about 100% and wherein the styrene component constitutes at least about 50% by weight of the total weight of styrene, acrylic acid ester and cross-linking agent.

References Cited

UNITED STATES PATENTS 2,406,412  8/1946  Speakman _____ 117—141
3,031,334  8/1962  Lundgren _____ 8—127.6

NORMAN G. TORCHIN, Primary Examiner

J. CANNON, Assistant Examiner

U.S. Cl. X.R.

8—127.6; 117—141

PO-1050
(5/69)

UNITED STATES PATENT OFFICE
CERTIFICATE OF CORRECTION

Patent No. 3,457,027     Dated July 22, 1969

Inventor(s) Edgar Dare Bolinger et al.

It is certified that error appears in the above-identified patent and that said Letters Patent are hereby corrected as shown below:

Column 1, line 31, delete "ether" and substitute --ester--. Column 4, line 27, delete "lyst system. Ferric salts can be used as oxidizing agents" and substitute --temperatures may be conduced when the oxidizing agent--. Column 5, line 39, delete "silver" and substitute --sliver--. Column 6, line 17, delete "determined" and substitue --determine--; line 30, delete "tact" and substitute --tract--; line 71, after "and" insert --forth--. Column 7, line 48, after "least" insert --about--.

SIGNED AND
SEALED
MAR 3 1 1970

(SEAL)
Attest:

Edward M. Fletcher, Jr.
Attesting Officer

WILLIAM E. SCHUYLER, JR.
Commissioner of Patents